United States Patent
Wan

(10) Patent No.: US 10,739,546 B2
(45) Date of Patent: Aug. 11, 2020

(54) IMAGING LENS

(71) Applicant: Jia Wan, Shenzhen (CN)

(72) Inventor: Jia Wan, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 85 days.

(21) Appl. No.: 15/680,268

(22) Filed: Aug. 18, 2017

(65) Prior Publication Data

US 2018/0299635 A1    Oct. 18, 2018

(30) Foreign Application Priority Data

Apr. 15, 2017   (CN) .................... 2017 2 0398119 U

(51) Int. Cl.
| | | |
|---|---|---|
| *G02B 5/00* | (2006.01) | |
| *G02B 7/02* | (2006.01) | |
| *G02B 27/00* | (2006.01) | |
| *G02B 5/02* | (2006.01) | |
| *G03B 11/04* | (2006.01) | |

(52) U.S. Cl.
CPC ............. *G02B 7/021* (2013.01); *G02B 5/021* (2013.01); *G02B 27/0018* (2013.01); *G03B 11/045* (2013.01)

(58) Field of Classification Search
CPC .......... G02B 1/10; G02B 5/003; G02B 5/005; G02B 7/002; G02B 7/021; G02B 7/02; G02B 5/021; G02B 27/0018; G03B 11/045

USPC ......................................................... 359/611
See application file for complete search history.

(56) References Cited

U.S. PATENT DOCUMENTS

| | | | | |
|---|---|---|---|---|
| 8,649,111 B2 * | 2/2014 | Yano | .................. | G02B 13/0085 359/599 |
| 2011/0050978 A1 * | 3/2011 | Yano | ...................... | G02B 7/022 348/335 |
| 2011/0050988 A1 * | 3/2011 | Yano | ..................... | H04N 5/2257 348/374 |
| 2012/0229916 A1 * | 9/2012 | Yano | .................. | G02B 13/0085 359/707 |
| 2016/0349504 A1 * | 12/2016 | Kim | ................... | G02B 27/0018 |

* cited by examiner

*Primary Examiner* — William R Alexander
(74) *Attorney, Agent, or Firm* — IPro, PLLC; Na Xu

(57) ABSTRACT

The present disclosure provides an imaging lens. The imaging lens includes a lens barrel with an accommodation space; a lens group located in the accommodation space and connected with the lens barrels; and a shading board positioned between two adjacent lenses. The lens barrel includes a first cylinder wall with an optical aperture and a second cylinder wall bending and extending from the first cylinder wall. The first cylinder wall and the second cylinder wall enclose and form the accommodation space. The shading board includes a side wall close to the second cylinder wall, an object side surface adjacent to an object side, an image side surface close to an image side, a connecting surface extending from the object side surface to the connecting surface, and a cambered Lambertian surface disposed on the connecting surface.

4 Claims, 1 Drawing Sheet

IMAGING LENS

FIELD OF THE PRESENT DISCLOSURE

The present disclosure relates to optical imaging technology, especially for an imaging lens used for various electronic equipment.

DESCRIPTION OF RELATED ART

Recent years, with a development of imaging technology and an emerging of an electronic product with an imaging function, an optical imaging lens has been extensively applied in various products, and improved and optimized constantly. Currently, a direction of improving most of imaging lenses is how to make the imaging lens smaller and thinner, and choose a proper lens with a good degree of adaptability of optical characteristics while making the imaging lens smaller and thinner, and study how to integrate them together to guarantee a good imaging result. However, during imaging, because all the light into the imaging lens from various angles will be reflected inside and outside the lens for many times and causes an interference problem from a stray light, which will bring remarkable impact to the imaging quality. Therefore, although a shading piece or shading board is added between the pieces of imaging lens to stop some stray light, these measures can only stop or absorb some stray light, which has relatively smaller role of weakening the stray light as a whole, and can't guarantee the good imaging result.

Therefore it is necessary to provide an imaging lens for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
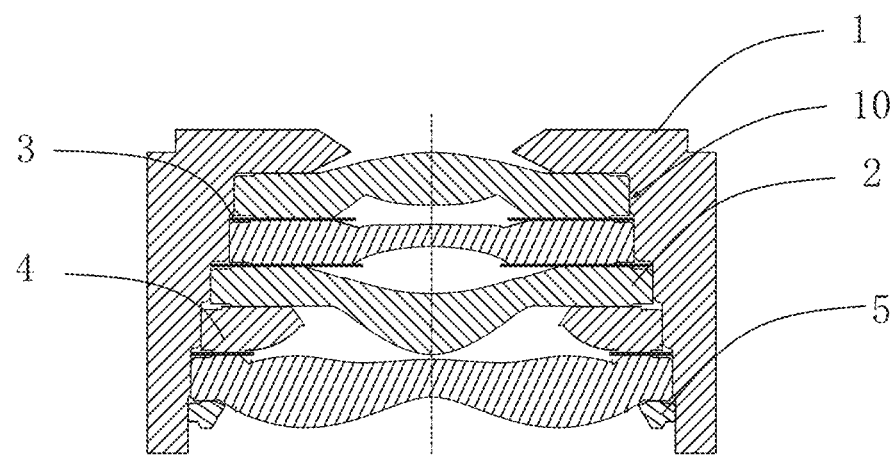
FIG. 1 is an illustrative cross-sectional view of an imaging lens in accordance with an exemplary embodiment of the present disclosure.
Figure 2:
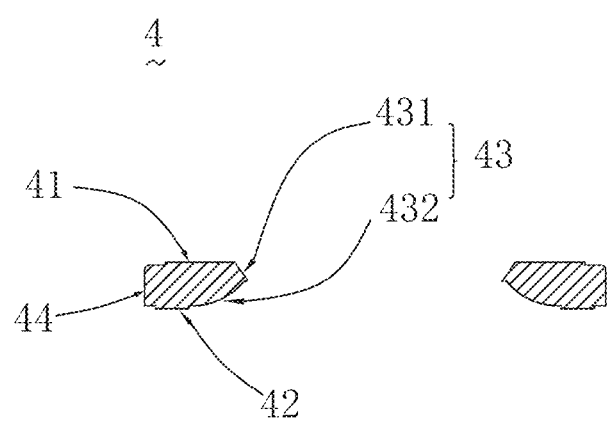
FIG. 2 is an illustrative cross-sectional view of a shading board of the imaging lens in FIG. 1.

An imaging lens inn accordance with an exemplary embodiment of the present disclosure, as shown in FIGS. 1-2, including a lens barrel 1 with an accommodation space, a lens group 2 set in the accommodation space and connecting with the lens barrel 1. The lens barrel 1 includes a first cylinder wall 11 with optical aperture 110 and a second cylinder wall 12 bending and extending from the first cylinder wall 11. The first cylinder wall 11 and the second cylinder wall 12 enclose and form the accommodation space. The lens group 2 includes at least two lenses having a common optical axis. A shading board 4 is clamped between two adjacent lenses. The shading board 4 includes a side wall 44 adjacent to the second cylinder wall 12, an object side surface 41 adjacent to an object side and connecting with the side wall 44, an image side surface 42 adjacent to an image side and connecting with the side wall 44, a connecting face 43 extending from the object side surface 41 far away from an edge of the side wall 44 to the image side surface 42. An arc surface is disposed on the connecting face 43 facing the optical axis. The arc is Lambertian surface.

The shading board 4, as shown in FIG. 2, includes the object side surface 41, the image side surface 42, the connecting surface 43 and the side wall surface 44. Make cambered surface and Lambertian treated for a connecting surface 43 of the shading board 4 to make stray light coming to the connecting surface 43 to be scattered evenly when it is reflected into lens group, so it cannot be reflected into lens group centralizedly. It weakens the reflected stray light or stray light reflected and formed in a lens barrel 1 to a larger extent. It weakens the local influence of stray light on the imaging of the lens group 2 to solve the issue of stray light effectively and ensure good imaging quality.

Be noted that the Lambertian surface is just one kind of near-perfect diffuse surface. When Incident illumination is fixed, the reflected brightness is a constant by observing reflector from any angles. Furthermore, one reflected light of any angles (namely the stray light reflected on a connecting surface 43 in the mode of execution) will reflect in all direction in same luminous intensity. In this way, the beam of incident light is scattered evenly.

In the imaging lens, the light reflected in the connecting surface 43 will be reflected into the light-in side of lens group 2 by the connecting surface 43. The connecting surface 43 is made into cambered Lambertian surface raising to one side of optical axis that can scatter the reflected stray light reflected outside of the lens or formed on the lens barrel wall 10 to weaken the local influence of stray light on the imaging of the lens group 2 to improve the whole imaging quality.

It is understandable, at least two lenses of lens group 2 inside lens are set. It can be three lens, four lenses, five lenses or more. Specific quantity can be set according to different demands. In the mode of execution, a imaging lens with four lenses is adopted. In addition, the shading board 4 can be clamped between any two adjacent lenses. The position of shading board 4 can be set according to the demand. In the mode of execution, position of the shading board 4 lies between two lenses most close to image side.

Preferably, a connecting face 43 includes a first shading face 431 bending and extending from object side surface 41 close to the edge of optical axis toward the direction of optical axis and a second shading face 432 extending and bending from the first shading face 431 to the direction away from the direction of optical axis and connecting with the image side surface 42. The second shading face 432 is a cambered surface raising toward one side of optical axis and the cambered surface is Lambertian surface. Cambered Lambertian surface is set on one side of a shading board 4 close to image side. It can scatter stray light around imaging face greatly. It can get good imaging effect and the operation of the setting of structure is simple.

It is understandable, the first shading face 431 can be cambered surface raising toward one side of optical axis on the basis that the second shading face 432 is cambered surface Lambertian surface. Make the first shading face 431 of the shading board 4 into curved Lambertian surface.

Scatter reflected stray light while shelter incident stray light to avoid the unnecessary reflected stray light formed on the inner walls of a lens group 2 and lens barrel 1 to influence the final imaging quality.

It is understandable, the connecting face 43 can have the structure of a first shading face 431 and a second shading face 432 and the whole raised structure. Among a changed mode of execution, the connecting face 43 extends smoothly from the object side surface 41 to the direction away from the optical axis to the image side surface 42. The whole connecting face 43 is a raised cambered surface. The cambered surface is a Lambertian surface. When the connecting face 43 is set as raised Lambertian surface structure extending to the direction away from the direction of optical axis smoothly, it means that the whole connecting face 43 faces the image side, and it can eliminate stray light around the imaging image side to a greater extent.

Furthermore, the mode of execution can includes a shading piece 3. The shading piece 3 is clamped between any two adjacent lenses of the lens group 2. Shading piece 3 can reduce the reflection of lens barrel wall 1. The shading piece 3 set between every two lenses can reflect appropriately some stray light and the reflection of light inside the imaging lens effectively to avoid the influence of stray light on the imaging quality on the basis that a connecting face 43 of a shading board 4 is set as curved Lambertian surface. It is worth mentioning that the shading piece 3 mostly close to two adjacent lenses of image side, as shown in FIG. 1, is located on the image side of the shading board 4. It is understandable that the shading piece 3 can be located on the object side of the shading board 4.

Understandably, a shading piece 3 can be set as a hollow ring structure, and an amount and location of the shading piece 3 can be decided as the case may be, besides, under the premise where the stray light is stopped efficiently, make it thinner as possible as it can, e.g.: choose more ideal size between 1 mm~5 mm.

In addition, it can includes a junk ring 5 in the mode of execution. Lens group 2 is clamped between the first cylinder wall 11 and the junk ring 5. The described press ring 5 can tighten the lens group 2 in the imaging lens and the shading piece 3 and the shading board 4 etc clamped between the lens group 2, in order to stabilize the structure of the whole lens. In the mode of execution, the junk ring 5 is set on the lens image side most close to the image side in the lens group 2. It can be understandable that junk ring 5 can be set in other parts according to the actual demand.

The junk ring 5 and a lens barrel wall 10 of lens barrel 1 is fixed and connected. Specifically, it can realize that the junk ring 5 can be connected with a lens barrel wall 10 in the mode of sticking or other ways and it can have connecting through to hold junk ring 5 in the corresponding place of the lens barrel wall 10. In addition, the junk ring 5 can be metal junk ring and plastic junk ring as well. In the mode of execution, the adopted junk ring 5 is plastic junk ring and is connected with the lens barrel wall 10 of the lens barrel 1 through way of sticking.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An imaging lens, including:
   a lens barrel with an accommodation space, the lens barrel including a first cylinder wall with an optical aperture and a second cylinder wall bending and extending from the first cylinder wall, the first cylinder wall and the second cylinder wall enclosing and forming the accommodation space;
   a lens group located in the accommodation space and connected with the lens barrel, the lens group including at least two lenses with a common optical axis;
   a shading board positioned between two adjacent lenses, the shading board including a side wall close to the second cylinder wall, an object side surface adjacent to an object side and connecting with the side wall, an image side surface close to an image side and connecting with the side wall, a connecting surface extending from the object side surface to the image side surface;
   the connecting surface includes: a first shading surface bending and extending toward the optical axis from the edge of the object side surface near the optical axis; a second shading surface bending and extending from the first shading surface in a direction away from the optical axis;
   the second shading surface is a Lambertian surface and consists of a convex arc facing the optical axis in a cross sectional view containing the optical axis; the second shading surface is directly connected to both the image side surface and the first shading surface.

2. The imaging lens as described in claim 1, wherein the first shading surface is a Lambertian surface and consists of a convex arc facing the optical axis in a cross sectional view containing the optical axis; the first shading surface is directly connected to both the object side surface and the second shading surface.

3. The imaging lens as described in claim 1 further including shading piece and the shading piece is clamped between two adjacent lenses.

4. The imaging lens as described in claim 2 further including a junk ring, wherein the lens group is clamped between the first cylinder wall and the junk ring.

* * * * *